United States Patent
Aihara et al.

[11] Patent Number: 5,433,815
[45] Date of Patent: Jul. 18, 1995

[54] APPARATUS FOR TRANSFERRING AND SETTING BEAD PART ASSEMBLIES FOR TIRES

[75] Inventors: Toru Aihara; Kazuo Mogi; Naoki Sasaki, all of Hiratsuka; Yoshinori Miyamoto, Nagasaki; Hidemasa Sato, Nagasaki; Jiro Agawa, Nagasaki, all of Japan

[73] Assignee: The Yokohama Rubber Co., Ltd., Tokyo, Japan

[21] Appl. No.: 84,237

[22] PCT Filed: Nov. 11, 1992

[86] PCT No.: PCT/JP92/01466
§ 371 Date: Jul. 8, 1993
§ 102(e) Date: Jul. 8, 1993

[87] PCT Pub. No.: WO93/09935
PCT Pub. Date: May 27, 1993

[30] Foreign Application Priority Data

Nov. 12, 1991 [JP] Japan .................... 3-295766
Dec. 26, 1991 [JP] Japan .................... 3-345194
Apr. 27, 1992 [JP] Japan .................... 4-107595

[51] Int. Cl.⁶ .............................. B29D 30/32
[52] U.S. Cl. ............................ 156/403; 156/131; 156/406.2
[58] Field of Search ............... 156/131, 403, 126, 135, 156/136, 111, 396, 406.2, 422, 569, 570, 572; 221/164; 414/796.4, 929

[56] References Cited

U.S. PATENT DOCUMENTS

4,369,086  1/1983  Nakahama et al. .......... 156/403

FOREIGN PATENT DOCUMENTS

70547   4/1984  Japan ........................ 156/396
175235  7/1990  Japan .
845345  5/1982  U.S.S.R. ................... 156/403

Primary Examiner—Geoffrey L. Knable
Attorney, Agent, or Firm—Nikaido, Marmelstein, Murray & Oram

[57] ABSTRACT

Method of transferring and setting bead part assemblies for tires, which comprises providing a bead part assembly stocking part in which a number of bead part assemblies is stacked one on top of the other in tiers through separators, an emptied separator collecting part disposed in the proximity of the bead part assembly stocking part, a tire building machine for thereon receiving bead part assemblies and building tires, bead part assembly holding means for picking up bead part assemblies one at a time and a separator holding means for picking up the separators one at a time; the step of causing the bead part assembly holding means to pick up a bead part assembly from the bead part assembly stocking part and carry the picked-up bead part assembly to the tire building machine and the step of causing the separator holding means to pick up a separator from the bead part assembly stocking part and carry the picked-up separator to the emptied separator collecting part.

11 Claims, 13 Drawing Sheets

1

APPARATUS FOR TRANSFERRING AND SETTING BEAD PART ASSEMBLIES FOR TIRES

ART FIELD

The present invention relates to a method of and apparatus for transferring and setting bead part assemblies for tires, and more particularly, a method of and apparatus for transferring and setting assemblies of bead forming parts for tires to and on a tire building machine at a high efficiency.

BACKGROUND ART

As illustrated in FIG. 17 of the accompanying drawings, tires T have such an internal structure in which while a bead core Bc composed of a bundle of metal wires formed in the shape of a ring is arranged in a bead portion 100 at each of the tire's left and right sides, a bead filler Bf of a hard rubber is arranged about the outer periphery of the bead core, and respective ends of a carcass 101 are turned up to enrobe the bead core Bc and the bead filler Bf. In building such tires, a number of bead part assemblies B like the one shown in FIG. 18 is provided by preparatively assembling together the bead core Bc and the bead filler Bf yet to be vulcanized and the bead part assemblies B are then supplied one by one to a tire building machine in order to provide unvulcanized tires (green tires).

Then, bead fillers yet to be vulcanized are sticky, so that if a number of bead part assemblies is collected in a stacked state, they tend to undergo adhesion to one another, when problems are encountered such that the bead part assemblies have to be isolated from one another, this taking time and labor, and that bead fillers are permit ted to undergo deformation and a quality lowering. Thus, if an attempt is made to s tore bead part assemblies in a mutually isolated condition in order to avoid the above problems, another problem is met that not only it takes time and labor to fulfil the necessary operation therefor but is it also required to secure a relatively large space for the storage of bead part assemblies.

Therefore, recently there was a proposition made to place bead part assemblies individually separately on a spacer and store them in tiers, horizontally set by set of a bead part assembly and a spacer. In this way, it is made possible to store a number of bead part assemblies at a location in a relatively limited space. However, the operation for separating spacers out of the stock of bead part assemblies stacked with the spacers interposed between them, taking out the bead part assemblies and feeding them one by one to the tire building machine, has to rely on a manual handling, so that a neck is involved for attaining an enhancement of the tire building efficiency.

A primary object of the present invention is to provide a method of and apparatus for transferring and setting bead part assemblies for or of tires which can be relied on in highly efficiently supplying bead part assemblies stacked in tiers through separators to a tire building machine and enhancing the tire production efficiency.

It is also an object of the present invention to provide a method of and apparatus for transferring and setting bead part assemblies for tires by which emptied separators can be efficiently collected.

DISCLOSURE OF THE INVENTION

The method of transferring and setting bead part assemblies for tires attaining the above objects according to the present invention is characterized by providing a stocking part in which a number of bead part assemblies is stacked in tiers through separators, an emptied separator collecting part disposed in the proximity of the bead part assembly stocking part, a tire building machine for thereon receiving the bead part assemblies and building tires, holding means for picking up the bead part assemblies one at a time and separator holding means for picking up separators one at a time, the step done by the holding means of picking up the bead part assemblies from the bead part assembly stocking part and transferring the picked-up bead part assembly to the tire building machine, and the step done by the separator holding means of picking up separators from the bead part assembly stocking part and transferring the picked-up separator to the emptied separator collecting part.

The apparatus for carrying out the above method according to the present invention is characterized by comprising a stocking part in which a number of bead part assemblies is stacked in tiers through separators, an emptied separator collecting part disposed in the proximity of the bead part assembly stocking part, a tire building machine for thereon receiving the bead part assemblies and building tires, holding means for picking up the bead part assemblies and separator holding means for picking up separators, wherein the holding means for bead part assemblies is adapted to pick up bead part assemblies one at a time from the bead part assembly stocking part and transfer the picked-up bead part assembly to the tire building machine, and the separator holding means is adapted to pick up separators one at a time from the bead part assembly stocking part and transfer the picked-up separator to the emptied separator collecting part.

According to such present invention, bead part assemblies are picked up from the bead part assembly stocking part and transferred to the tire building machine by the bead part assembly holding means, and separators are picked up from the bead part assembly stocking part and transfered to the emptied separator collecing part by the separator holding means, so that it can be performed to highly efficiently supply bead part assemblies stacked in tiers through separators to the tire building machine and enhance the tire building productivity. Also, it is possible to collect emptied separators at a high operation efficiency.

BEST MODE FOR CARRYING OUT THE INVENTION

Figure 1:
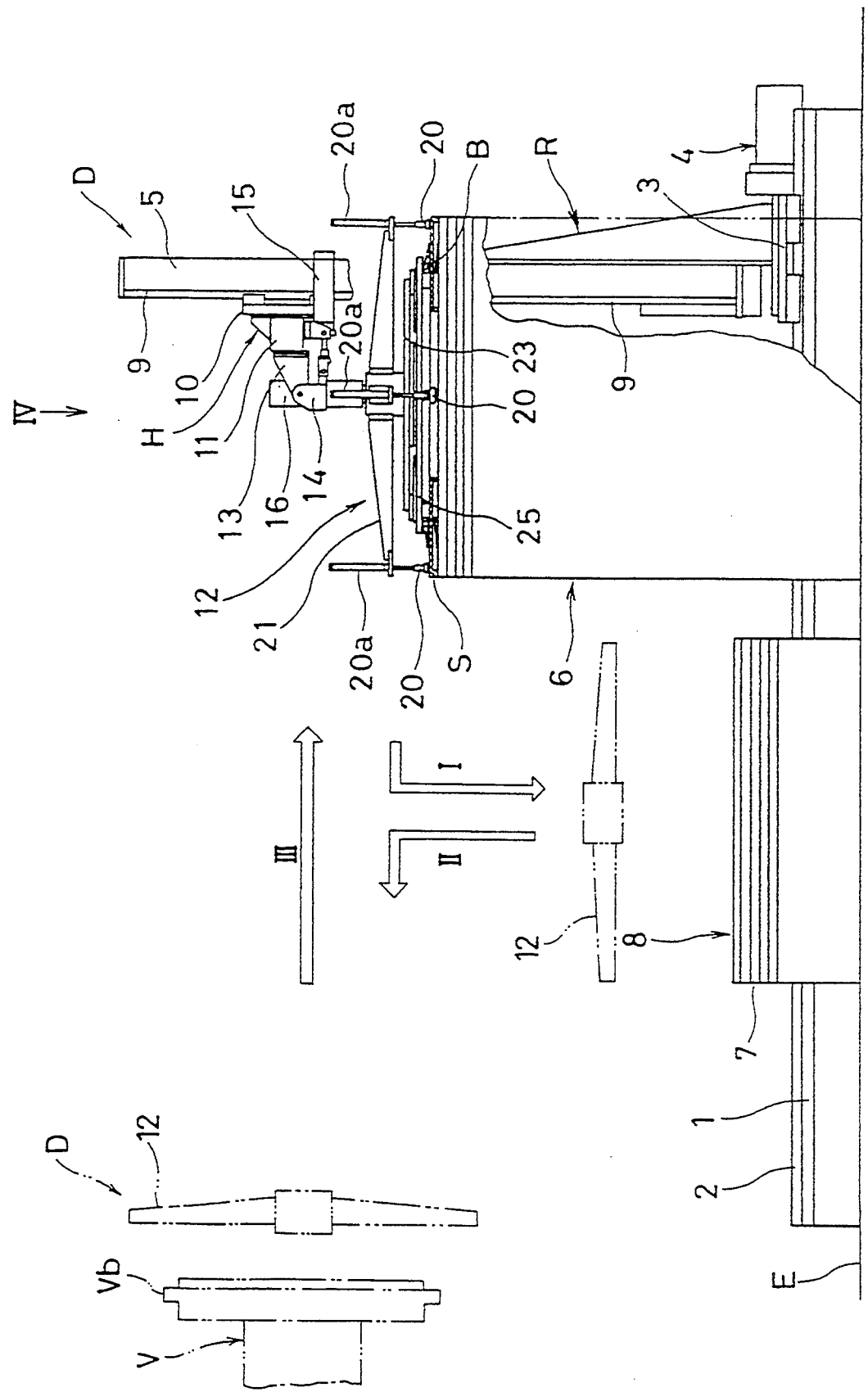
FIG. 1 is a partly broken-away front elevation of apparatus for transferring and setting assemblies of bead forming parts of tires according to the present invention.
Figure 2:
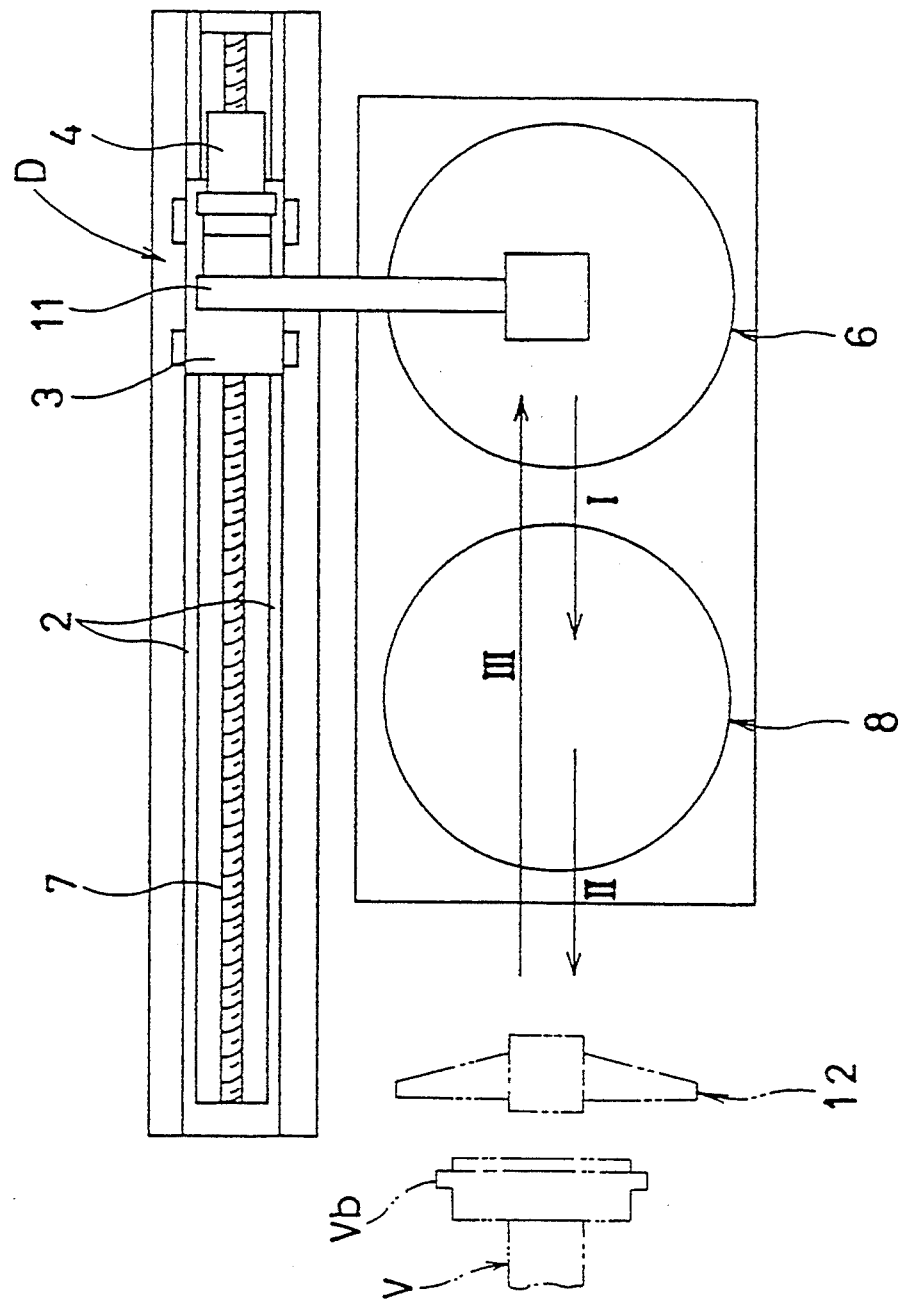
FIG. 2 is a plan view, taken for illustration of the apparatus for transferring and setting bead part assemblies for tires according to the invention.

As shown in FIGS. 1 and 2, the apparatus for transferring and setting assemblies of bead parts according to the present invention comprises a stocking part 6 for storing a number of bead part assemblies B vertically stacked in tiers through separators S, a collecting part 8 for emptied separators, arranged in the proximity of the stocking part 6 for the bead part assemblies, and a tire building machine V for thereon receiving the bead part assemblies B and building tires, and the arrangement is made such that transfer means D can be moved from one to the other of the bead part assembly stocking part 6, the emptied separator collecting part 8 and the tire building machine V.

Figure 3:
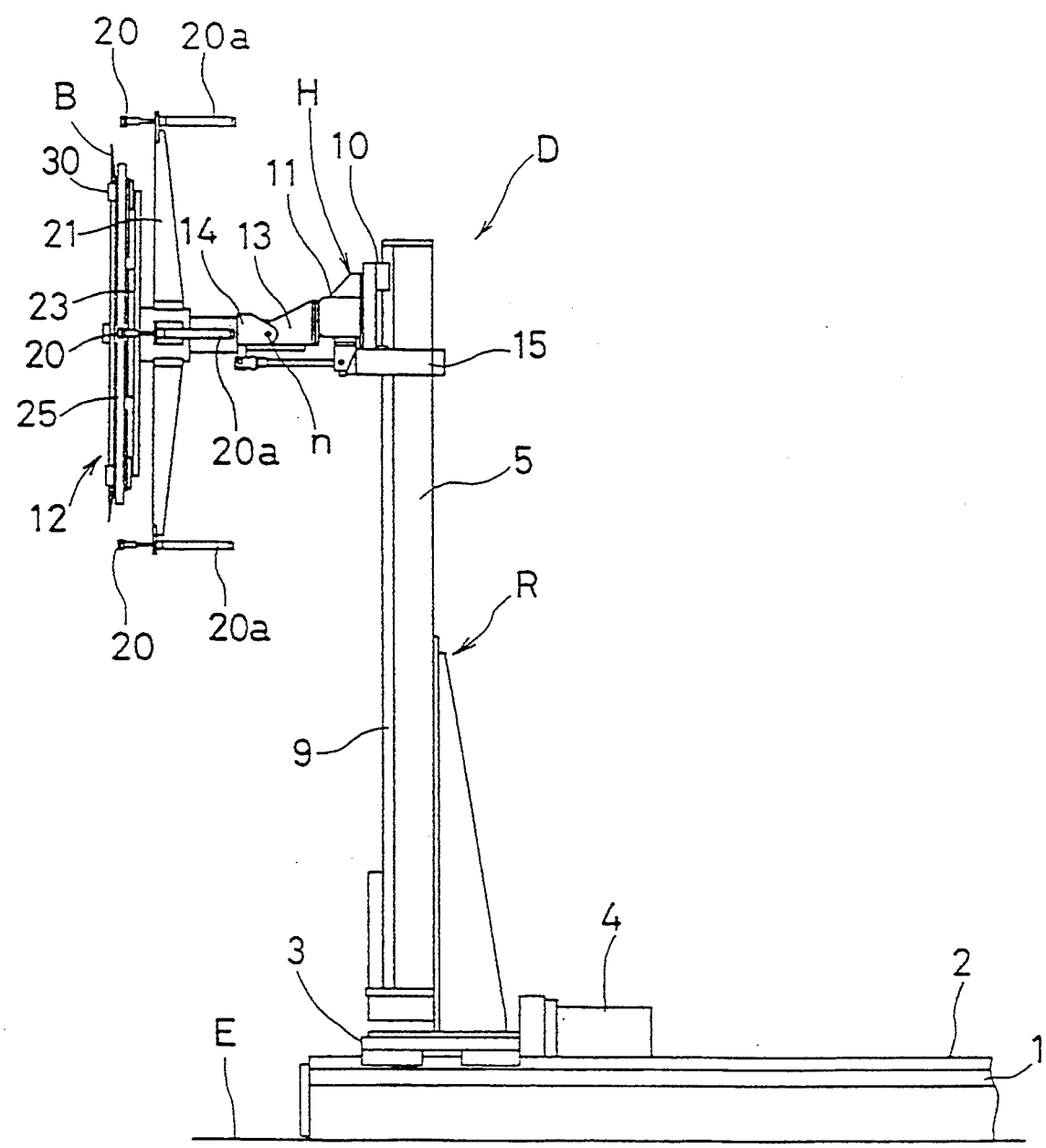
FIG. 3 is a front elevation of transfer means for bead part assemblies according to the invention.

As shown in FIG. 3, the transfer means D is provided with a horizontal unit R which can be driven to reciprocal motion along a pair of guide rails 2 installed on a mounting bed 1 fixed on a base E. The horizontal unit R has a base seat 3 at its bottom, which is slidable back and forth along the guide rails 2, and is driven to run by a driving motor 4 attached to the base seat 3, through a ball screw 7 mounted between the guide rails 2 as shown in FIG. 2. A stanchion 5 is provided, standing on the base seat 3, by which a vertical guide rail 9 is supported.

Figure 4:
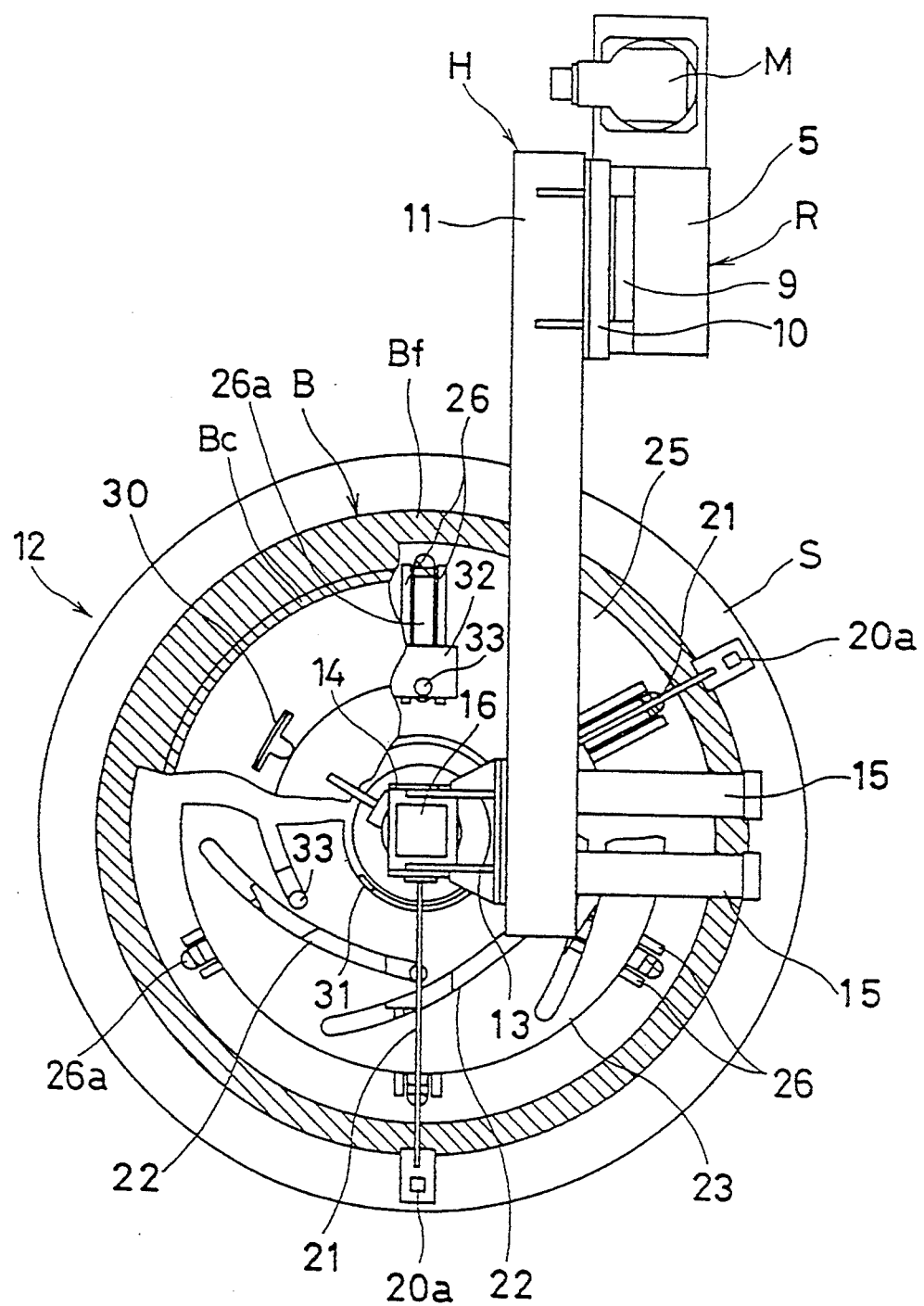
FIG. 4 is a plan view, taken in the direction shown by the arrow IV in FIG. 1, of the transfer means for bead part assemblies according to the invention.

To the stanchion 5, a vertical unit H is mounted, which has a base seat 10 adapted to go up or down along the guide rail 9 and which can be moved through the rotation of a ball screw (not shown) rotated by a driving motor M (FIG. 4). As shown in FIG. 4, an arm 11 extending in a horizontal direction is fixed to the base seat 10.

Figure 5:
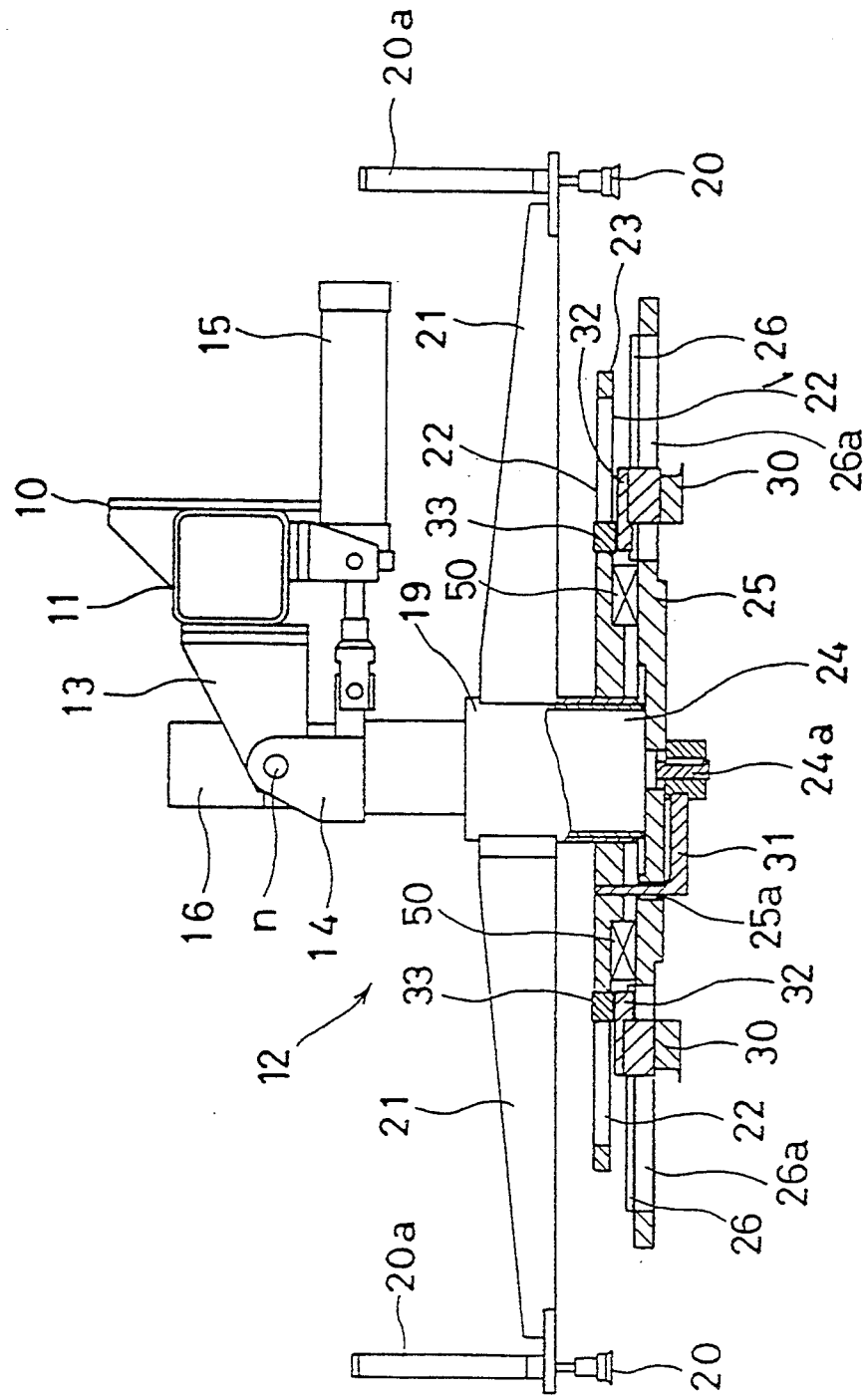
FIG. 5 is a partly sectional front elevation, showing transfer means provided with holding means for bead part assemblies and separator holding means.

As shown in FIGS. 4 and 5, further, a bifurcate bracket 13 is secured at an end portion of the arm 11 opposite the end at which it is fixed to the base seat 10, and to this bracket 13, a cylindrical bracket 14 is rotatably connected through a support shaft n. The bracket 14 can be driven to rotate about the support shaft n by a pair of cylinders 15 pivotally supported to the arm 11, and it is provided with holding means 12 as later to be detailed.

Figure 6:
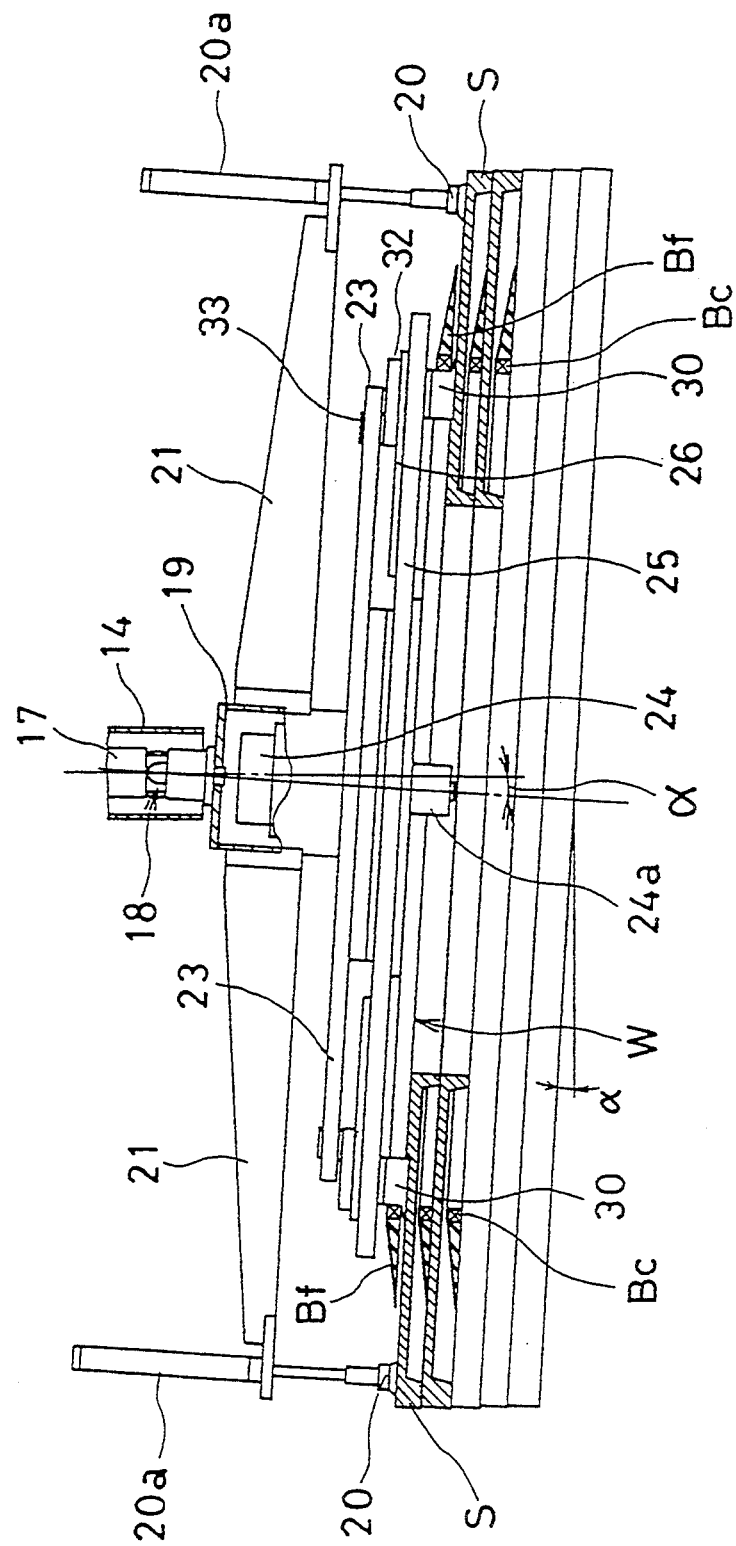
FIG. 6 is a view, taken for illustration of the operation condition in which the transfer means shown in FIG. 4 is picking up the set of a bead part assembly and a separator in the bead part assembly stocking part.
Figure 7:
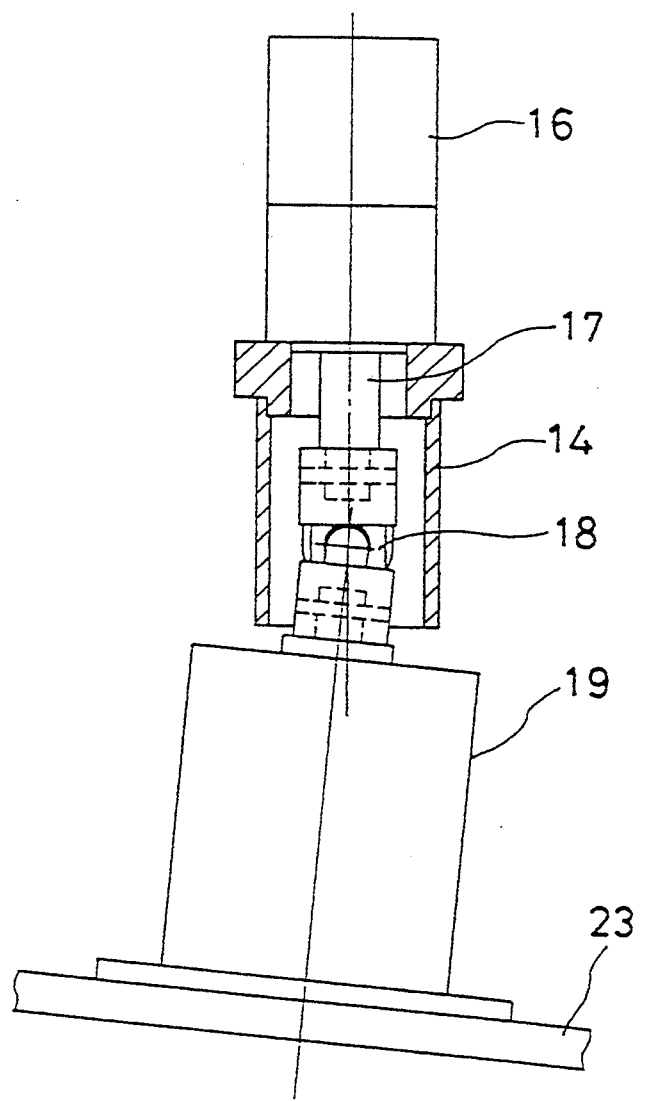
FIG. 7 shows an enlarged sectional view of a universal joint part in/of the transfer means of FIG. 4.

As shown in FIG. 7 as well as FIGS. 4 and 5, the bracket 14 that is rotatably supported as above has a cylinder 16 provided on its top end, and a rod 17 extending from the cylinder 16 is inserted into the bracket 14, which rod 17 has a cylindrical center block 19 provided at its leading end through a universal joint 18. As shown in FIG. 4 through FIG. 6, at least three arms 21 are fixed around the outer periphery of the center block 19, radially at constant intervals. At the leading or front end of each arm 21, an attraction pad 20 is attached as holding means for separators S, and the attraction pads 20 are adapted to move up and down as driven by lifting and lowering cylinders 20a. For the attraction pads 20, vacuum may be utilized or, in case the separators S comprise a ferromagnetic body, an electromagnet is effectively utilizable.

Also, at the lower end of the center block 19, a disk-shaped picker base 25 is fixed, and a cam plate 23 also of a disk shape is rotatably supported through a bearing 50 provided on the picker base 25. As shown in FIG. 4, the cam plate 23 is formed with arc-shaped guide grooves 22, extending slantly in the radial direction and at constant intervals in the circumferential direction. Inside the center block 19, further, a rotary actuator 24 is housed, which has a driving shaft 24a, to which an L-shaped rotary arm 31 is fixed, which in turn is connected through an arc-shaped groove 25a formed in the picker base 25 to the cam plate 23 to drive this cam plate 23 to rotate.

On the picker base 25, a pair of guide rails 26 is radially arranged at each of the plurality of locations corresponding to the locations of the arms 21. Sliding bases 32 engage the guide rails 26, and cam followers 33 engageable with the guide grooves 22 of the cam plate 23 are mounted on the sliding bases 32. On the underside of the sliding bases 32, engaging claws 30 are fixed through grooves 26a formed along the pairs of guide rails 26. The engaging claws 30 constitute holding means for the bead part assembly B, which are provided at three or more points in the circumferential direction and which are moved to hold the bead part assembly B of a ring shape radially outwardly from the inner diameter side thereof.

Figure 8:
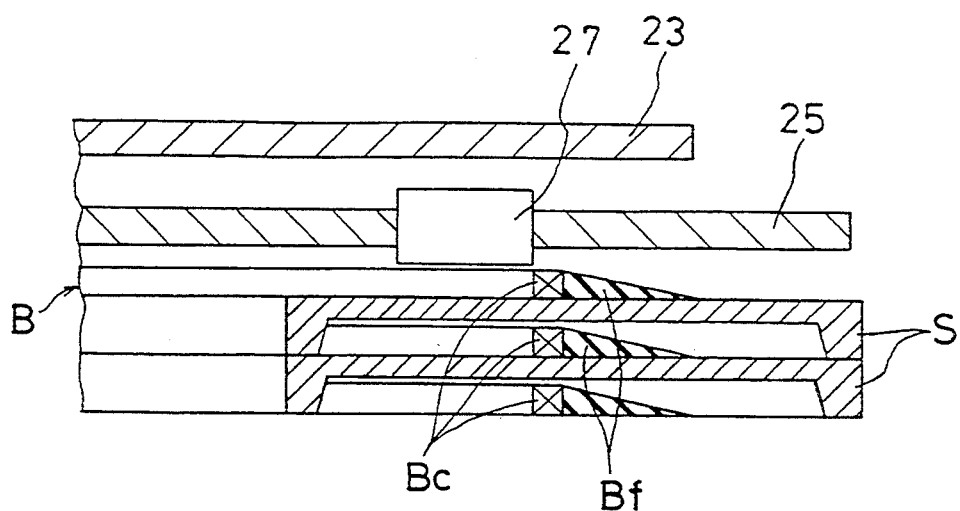
FIG. 8 is a sectional view, taken for illustration of a machine part including a distance detecting sensor mounted to the holding means.
Figure 9:
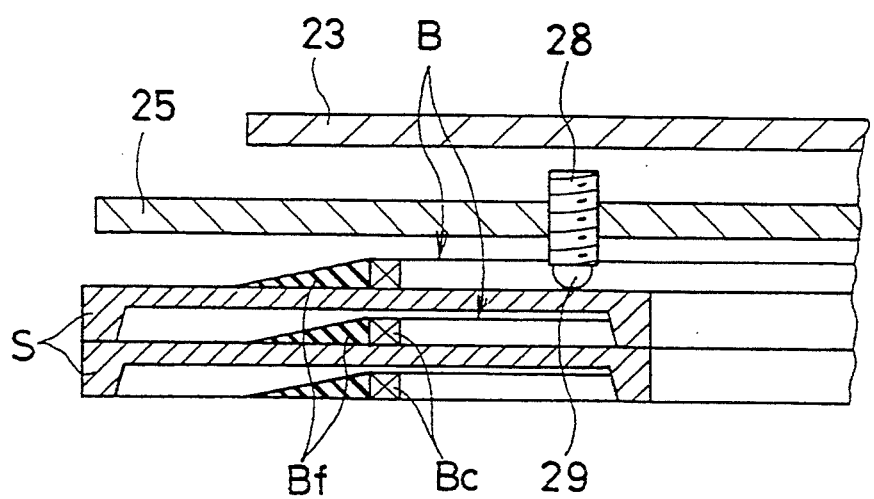
FIG. 9 is a sectional view, taken for illustration of a machine part including a stopper mounted to the holding means.

In operation, when the driving shaft 24a of the rotary actuator 24 rotates the cam plate 23 through the L-shaped rotary arm 31, the engaging claws 30 are moved outwardly or inwardly in the radial direction along the guide rails 26 of the picker base 25 to pick up a bead part assembly B or release a picked-up bead part assembly B. To permit engaging claws 30 to securely effect holding of the assembly B as described above, at least three distance detecting sensors 27 as shown in FIG. 8 are circumferentially arranged and mounted on the picker base 25. When the holding means 12 is lowered, the distance detecting sensor 27 detects that the picker base 25 has approached a separator S and issues a detection signal to stop lowering of the holding means 12 and, at the same time, put into operation the lifting and lowering cylinders 20a, the attraction pads 20 and the rotary actuator 24. The picker base 25 is provided also with at least three stoppers 28 as shown in FIG. 9, which are arranged circumferentially at constant intervals. The stoppers 28 are adjustable with respect to their height positions and provided at their respective lower ends with a rotatable ball 29.

Figure 10:
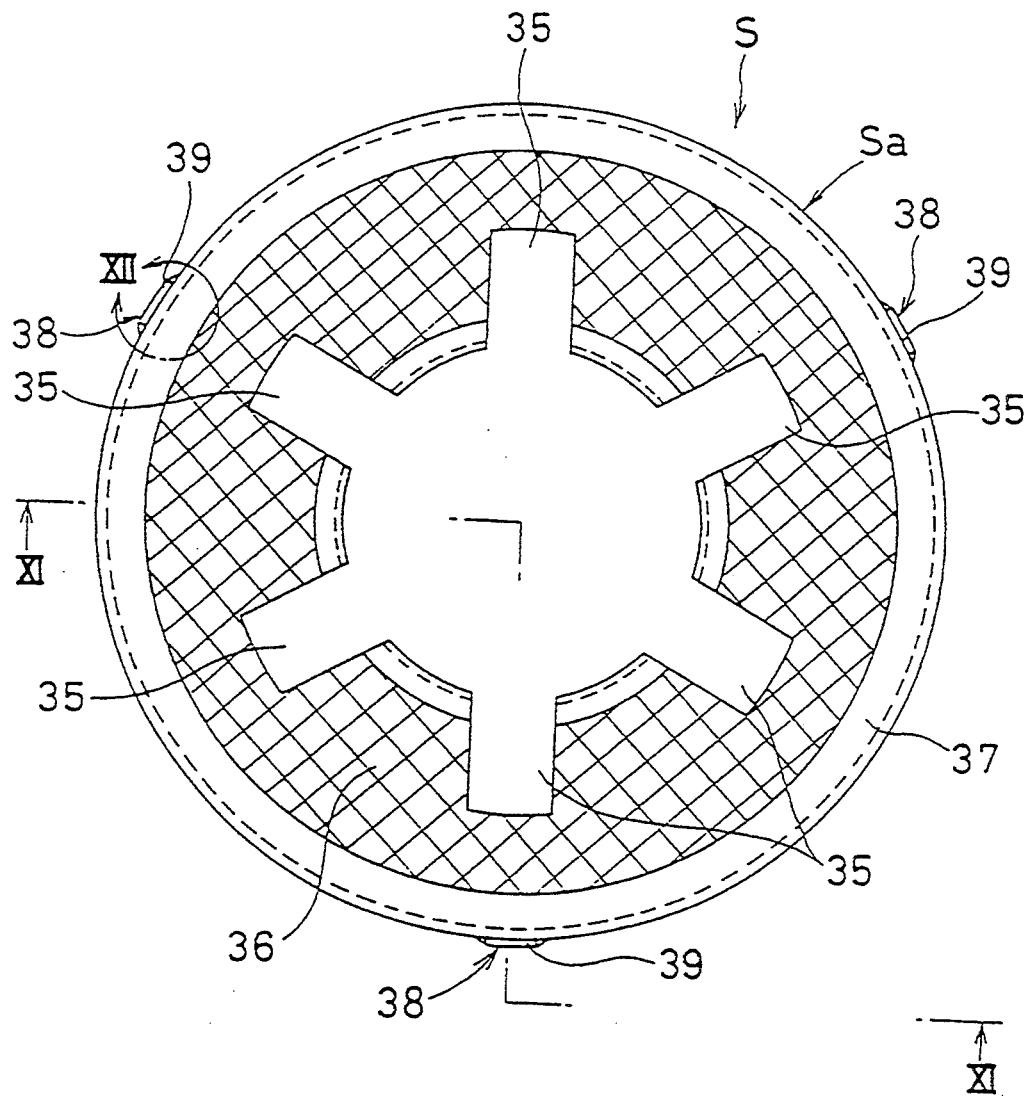
FIG. 10 shows a plan view of a separator used in or for the present invention.
Figure 11:
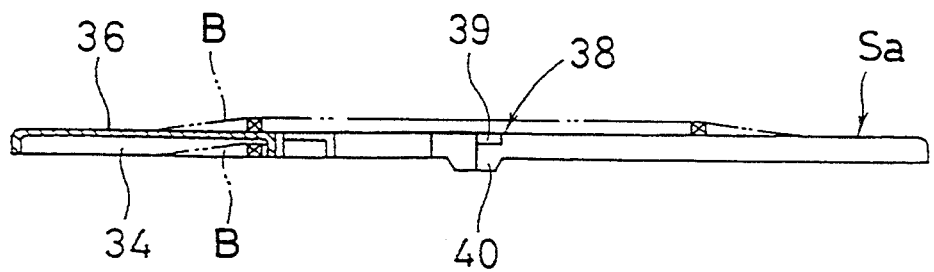
FIG. 11 is a sectional view, taken along the line XI—XI in FIG. 10.
Figure 12:
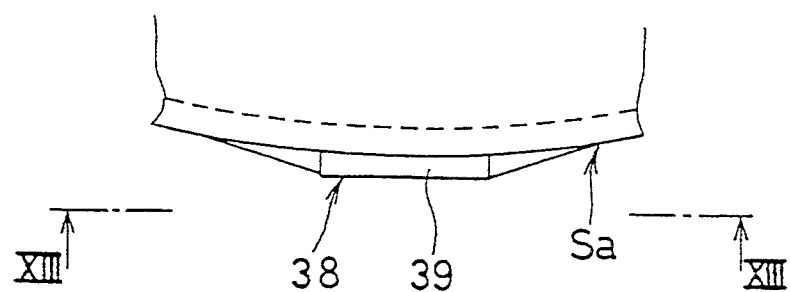
FIG. 12 is an enlarged plan view, showing the portion shown at XII in FIG. 10.
Figure 13:
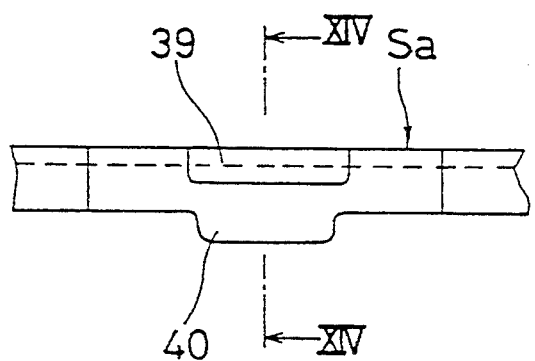
FIG. 13 is a side elevation, taken along the line XIII—XIII in FIG. 12.
Figure 14:
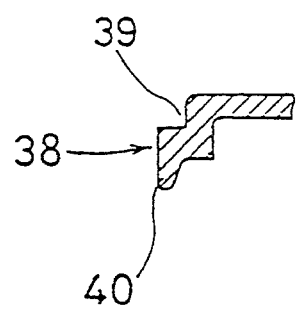
FIG. 14 is a sectional view, taken along the line XIV—XIV in FIG. 13.

As earlier described, the bead part assembly B is placed on a separator S and such sets of the assembly B and the separator S are piled in tiers, forming the stock part 6 of bead part assemblies B. As shown in FIG. 10, the separator S comprises a ring-shaped separator body Sa, which has a plurality of notch portions 35 radially outwardly extending from a central open space portion thereof so that at the times of picking up of bead part assemblies B, its interference with engaging claws 30 can be avoided. The upper surface shown by 36 of the separator body Sa is formed with a concavo-convex pattern so that a bead part assembly B placed on the separator S can be prevented from intimately or closely attach onto the surface 36. Although the surface 36 is made a toughened one on account of the concavo-convex pattern formed thereon as above, such toughened surface can be otherwise formed by forming a number of point-like recesses or projections. On the underside of the separator body Sa, further, a recess 34 is formed as shown in FIG. 11 so that a bead part assembly B placed on a lower located separator S can be received in a non-contacting state on account of the recess 34. Also on account of the recess 34, bead part assemblies B can be stored without the danger of impairing the unvulcanized bead fillers Bf which easily tend to undergo deformation. Also, the separator body Sa is formed on its upper surface 36 with an annular peripheral edge portion 37 which has a flat and smooth surface so that attraction or suction by the attraction pads 20 can easily take place.

As shown in FIG. 10 through FIG. 14, the separator body Sa is formed with recesses 39 at a plurality of points (three points in the illustrated embodiment), at the prescribed intervals, on its upper surface in its outer peripheral edge portion and, on its underside surface, with projections 40 engageable in the recesses 39 by fitting. The recesses 39 and the projections 40 in combination constitute positioning means 38 for a number of separators S to be altogether piled in tiers, in both the radial and the circumferential directions. By the provision of such positioning means 38, a number of separators can be stacked in tiers always in a stable condition without dislocation relative to one another. Consequently, in picking up bead part assemblies B one by one, the engaging claws 30 can without fail enter the notch portions 35 of separators S, whereby a secure picking up operation can be guaranteed. Also, a displacement of for example the phase in the circumferential direction of bead part assemblies B (for example, a mutual displacement of joining points of bead fillers Bf) can be prevented from occurring during transportation of the bead part assemblies, so that the tire building operation can be carried out with the tire forming parts constantly positioned at their respective prescribed locations, whereby stabilization of the tire uniformity can be realized.

In the instance of the embodiment shown in FIGS. 10 and 11, further, the separator body Sa is in the form of a flat plate, so that the bead filler Bf is in an erect position around outer periphery of the bead core Bc. In case it is desired that the bead filler Bf is in an inclined position, however, the upper surface 36 of the separator body Sa may be made an inclined surface. Further, although it may be devised that while the surface portion on which the bead core Bc is rested comprises a flat surface, the surface portion on which the bead filler Bf is placed comprises an inclined surface, a restriction is applied in this case, depending on the particular size of the bead part assembly B. Modifications in this respect are within a range of design changes which can be readily derived by skilled persons in the art.

Now a description will be entered into the operation for transferring and setting bead part assemblies to be carried out with use of the above described apparatus according to the present invention.

Initially the horizontal unit R is moved along the guide rails 2 to bring the transfer means D to a halt at the stocking or storing part 6 for the bead part assemblies, as shown in FIG. 1. Then, the lifting and lowering cylinder 16 is actuated to have the rod 17 extended, and with the center block 19 held in a rotatable state, the vertical unit H is lowered. Relying on a detection signal issued from the distance detecting sensors 27, the holding means 12 is brought to a halt on top of the bead part assembly stocking part 6. Preferably, the above lowering operation is carried out in a manner such that while it takes place at a high speed until the predetermined height position is reached, it is then switched to a low speed at a height position near the top of the bead part assembly stocking part 6. Even if the separator S takes an inclined position at an angle of $\alpha°$ relative to the horizon in the condition in which the holding means 12 is in contact with the top surface of the stocking part 6 as shown in FIG. 6, the holding means 12 can be pivoted through the universal joint 18 to follow the inclination at the angle $\alpha°$. Thus, the plurality of engaging claws 30 can be always brought to a virtually parallel position to the separator S and a failure-free picking up of the bead part assembly B can be carried out.

When the holding means 12 is brought to abut against the top surface of the bead part assembly stocking part 6, the rotary actuator 24 housed in the center block 19 starts operation to cause the cam plate 23 to rotate through the rotary arm 31. As the cam plate 23 rotates, the engaging claws 30 move radially outwardly to engage the inner diametral periphery of a bead part assembly B and effect holding of this bead part assembly B as shown in FIG. 6. Also, at the same time as the rotary actuator 24 starts operation, the plurality of attraction or suction pads 20 is brought to abut against the separator S through the operation of the lifting and lowering cylinder 20a and hold the separator S through attraction or suction.

Then, the holding means 12 of the transfer means D is lifted and, as shown by an arrow I in FIG. 1, moved to the emptied separator collecting part 8 and then down onto this collecting part 8. Then, the suction or attraction of the separator S by the suction or attraction pads 20 is released, resulting in the separator S alone being left on top of the emptied separator collecing part 8. The upper surface 36 of the separator S comprises a toughened surface as earlier described, so that the separator S can easily leave the bead part assembly B.

After the above separation of the separator S, the holding means 12 of the transfer means D is moved in the direction shown by an arrow II in FIG. 1 to the tire building machine V. At a position in front of the tire molding machine V, the rod 17 is now contracted by actuating the lifting and lowering cylinder 16 to bring the center block 19 to abut with its top surface against the underside surface of the bracket 14, whereby the holding means 12 is locked not to pivot. Then, the holding means 12 is turned 90° by the cylinder 15 to its position facing the tire building machine V as shown in FIG. 3, and thereafter it is moved towards a bead loader Vb of the tire molding machine V and then stopped. Then, the engaging claws 30 are retracted radially inwardly by actuating the rotary actuator 24 and the bead part assembly B is transferred and set on the bead loader Vb of the tire building machine V.

After the bead part assembly B is thus set on the bead loader Vb, the holding means 12 of the transfer means D is moved back to the bead part assembly storing part 6 as shown by an arrow III in FIG. 1 and, at the same time as this, the holding means 12 is turned 90° to take a downwardly facing position by actuating the cylinder 15. The above described operation steps are then repeated. Thus, without the need of relying on handling by an operator's hand, a number of bead part assemblies B stacked in tiers through separators S can be supplied to the tire building machine V automatically and at a high operation efficiency, and the tire building productivity can be enhanced. Also, it can be automatically carried out to stack emptied separators S in a position-controlled orderly manner, so that advantageously avoided can be the conventionally indispensable need for restacking of separators for the carrying out of the bead preparation step.

Figure 15:
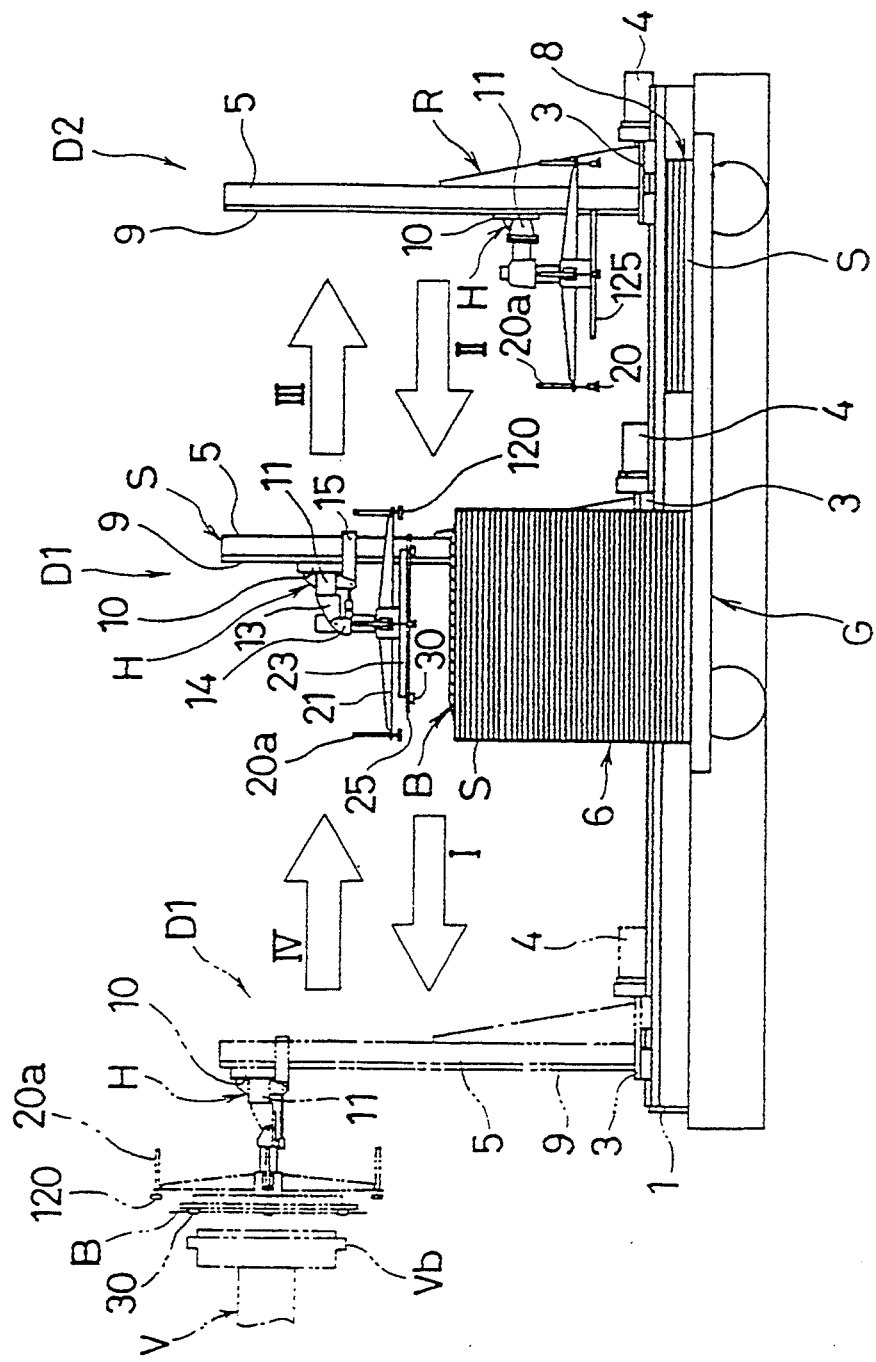
FIG. 15 is a front elevation, showing apparatus for transferring and setting tires' bead part assemblies according to another embodiment of the present invention.
Figure 16:
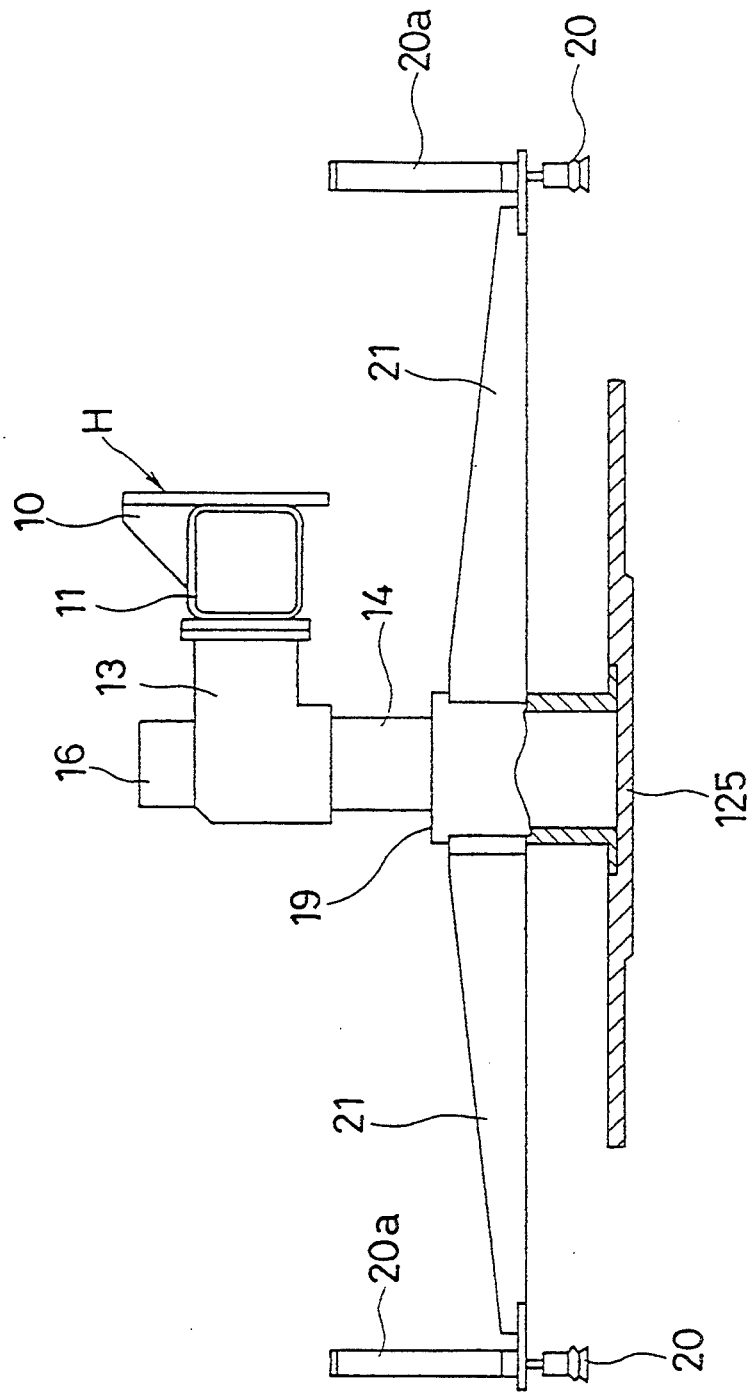
FIG. 16 is a front view, showing in enlargement separator holding means included in or of the apparatus of the second embodiment illustrated in FIG. 15.
Figure 17:
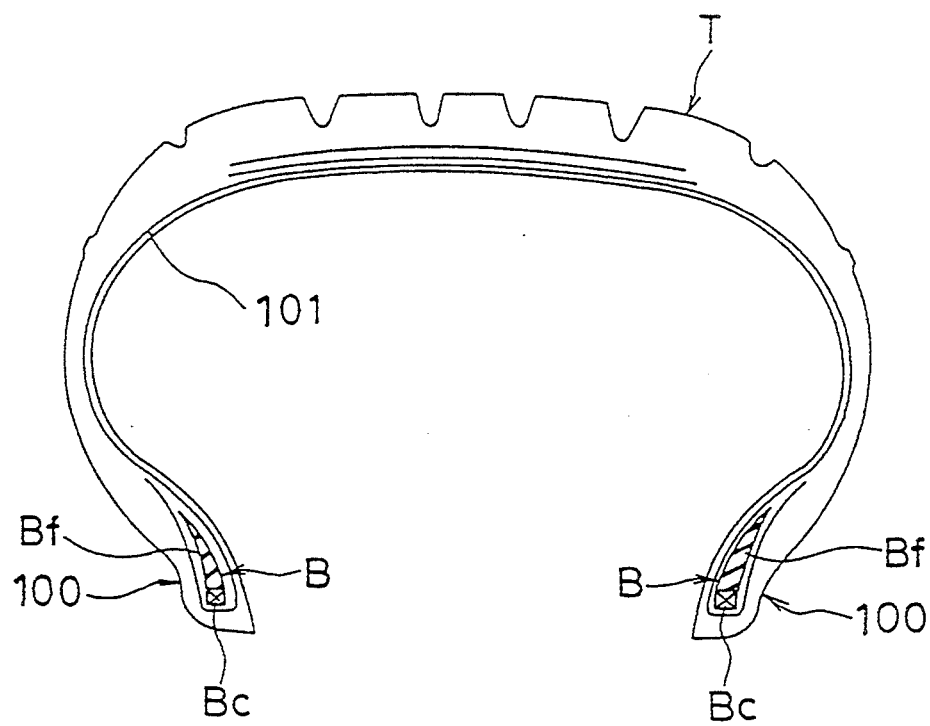
FIG. 17 is a vertical sectional view of a pneumatic tire.
Figure 18:
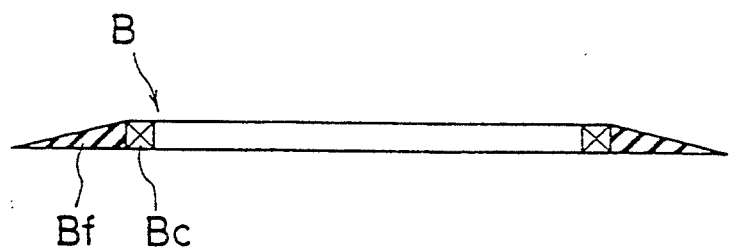
FIG. 18 shows a sectional view of an assembly of bead forming parts used in the pneumatic tire of FIG. 17.

FIG. 15 illustrates another embodiment of the present invention, which differs from the above described embodiment in respect of that the engaging claws 30 constituting holding means for bead part assemblies B and the suction or attraction pads 20 constituting holding means for separators S are provided separately to separate and mutually independent first transfer means D1 and second transfer means D2 respectively. Also, in the present embodiment, the bead part stocking or storing part 6 and the emptied separator collecting part 8 are provided on a movable wheeled carriage G.

The first transfer means D1 has at least three engaging claws 30 provided thereto i n a same manner as in the case of the transfer means D of the earlier described embodiment, and it is provided with pressing members 120 in place of the already described attraction or suction pads 20. The pressing members 120 are made of an elastic material such as rubber or the like, and operative so that when engaging claws 30 holding a bead part assembly B on a separator S are lifted, they press down the separator S in the direction opposite the direction of lifting through the operation of cylinders 20a and surely effect the separation away of the separator S. Obviously, the above described pressing members can be utilized in the case of the earlier described first embodiment of the present invention, too, together with the afore-described attraction pads.

Then, the second transfer means D2 is provided on its outer peripheral portion with at least three attraction pads 20 alike the transfer means D of the earlier described embodiment and, as fixed to the lower end of the center block 19 at its central part, with a supporting plate 125 in place of the earlier described picker base 25, this supporting plate 125 being provided with distance detecting sensors and stoppers in the same manner the picker base 25. Also, to the bracket 13 attached to the front side end of the arm 11, the bracket 14 is fixed so as not to be rotatable.

The first transfer means D1 and the second transfer means D2, which respectively are provided with bead part assembly holding means 30 and separator holding means 20, are moved from one to the other of the bead part assembly stocking part 6, the tire building machine V and the emptied separator collecting part 8 as shown by arrows in FIG. 15. In greater detail, the transfer means D1 operates in the first place to pick up a bead part assembly B at the bead part assembly stocking part 6, and then moves as shown by an arrow I to the location of the tire building machine V, at which it transfers the bead part assembly B onto the bead loader Vb. During the above operation of the first transfer means D1, the second transfer means D2 moves as shown by an arrow II to the position of the bead part assembly stocking part 6, and after it has picked up a separator S, returns as shown by an arrow III to the position of the emptied separator collecting part 8 to perform collection of separators S. During the above operation of the second transfer means D2, the first transfer means D1 returns as shown by an arrow IV to the position of the bead part assembly stocking part 6 and, after it has again picked up a bead part assembly B, moves as shown by the arrow I. As a result of that the first transfer means D1 and the second transfer means D2 operate alternately as described above, it becomes possible to supply bead part assemblies to the tire building machine at an enhanced operation efficiency and to further improve the tire building productivity. Also, collection of emptied separators can be effected at an enhanced operation efficiency.

As described above, according to the present invention, while bead part assemblies are picked up at and carried from their stocking part to a tire building machine by their holding means, separators are picked up at and carried from the tire part assembly stocking part to an emptied separator collecting part by separator holding means, so that bead part assemblies stacked in tiers through separators can be supplied to the tire building machine at a high efficiency and the tire building productivity can be enhanced. Also, emptied separators can be collected highly efficiently.

INDUSTRIAL APPLICABILITY

The method of and apparatus for transferring and setting bead part assemblies of tires bringing about the above described desirable results according to the present invention can be highly advantageously utilized in or for efficiently supplying bead part assemblies stacked in tiers through separators to a tire building machine.

What is claimed is:

1. Apparatus for transferring and setting bead part assemblies for tires, which comprises:
    a bead part assembly stocking part in which a number of bead part assemblies are stacked vertically in tiers through separators, an emptied separator collecting part disposed in the proximity of the bead part assembly stocking part, a tire building machine for thereon receiving the bead part assemblies and building tires, bead part assembly holding means for picking up bead part assemblies, and separator holding means for picking up the separators;
    the bead part assembly holding means being adapted to pick up bead part assemblies one at a time from the bead part assembly stocking part and carry the picked-up bead part assembly to the tire building machine;
    the separator holding means being adapted to pick up separators one at a time from the bead part assembly stocking part, carry the picked-up separator to the emptied separator collecting part, and collect and stack the emptied separator at the emptied separator collecting part in an orderly arrangement;

the bead part assembly holding means and the separator holding means being provided on a common transfer means and adapted to simultaneously pick up a bead part assembly and a separator at the bead part assembly stocking part;

the transfer means being adapted to move from the bead part assembly stocking part to the tire building machine past the emptied separator collecting part;

the transfer means being provided to a horizontal unit capable of reciprocating in horizontal directions and a vertical unit being vertically movably mounted on the horizontal unit, the bead part assembly holding means and the separator holding means being provided on the vertical unit;

the bead part assembly holding means being structured by a plurality of engaging claws which are capable of advancing or retracting in radial directions and are equi-distantly spaced in the circumferential direction;

the separator holding means is structured by attraction pads which can be lifted or lowered and are disposed radially outwardly of the plurality of engaging claws of the bead part assembly holding means;

both the bead part assembly holding means and the separator holding means being turnable between a downwardly facing position and a laterally facing position; and the transfer means including means for mounting both the bead part assembly holding means and the separator holding means to be selectively pivotable about a single point or be immovably fixed.

2. Apparatus as claimed in claim 1, in which the bead part assembly stocking part and the emptied separator collecting part are provided on a wheeled carriage.

3. Apparatus as claimed in claim 1, in which each separator comprises a separator body in the form of a ring having an upper surface formed as a concavo-convex roughened surface and an underside surface formed with an annular recess for receiving a bead part assembly located on a next lower separator in a condition of not contacting the underside surface of the separator body.

4. Apparatus as claimed in claim 3, in which the separator body is formed at a plurality of locations in the vicinity of an outer peripheral edge with engaging portions engageable with the corresponding or complementary engaging portions of an immediately adjacent separator body in a piled condition of separators.

5. Apparatus for transferring and setting bead part assemblies for tires, which comprises:

a bead part assembly stocking part in which a number of bead part assemblies are stacked vertically in tiers through separators, an emptied separator collecting part disposed in the proximity of the bead part assembly stocking part, a tire building machine for thereon receiving the bead part assemblies and building tires, bead part assembly holding means for picking up bead part assemblies, and separator holding means for picking up the separators;

the bead part assembly holding means being adapted to pick up bead part assemblies one at a time from the bead part assembly stocking part and carry the picked-up bead part assembly to the tire building machine;

the separator holding means being adapted to pick up separators one at a time from the bead part assembly stocking part, carry the picked-up separator to the emptied separator collecting part, and collect and stack the emptied separator at the emptied separator collecting part in an orderly arrangement;

the bead part assembly holding means and the separator holding means being separately provided on a first transfer means and a second transfer means respectively;

the first transfer means being adapted to move from the bead part assembly stocking part to the tire building machine;

the second transfer means being adapted to move from the bead part assembly stocking part to the emptied separator collecting part;

the bead part assembly holding means of the first transfer means being structured by a plurality of engaging claws which are equidistantly spaced in the circumferential direction and can be advanced or retracted in radial directions;

the separator holding means being structured by a plurality of attraction pads which are equidistantly spaced in the circumferential direction and can be lifted or lowered; and the first transfer means including vertically movable pressing members disposed radially outwardly of the plurality of engaging claws of the bead part assembly holding means, the pressing members being positioned such that when the engaging claws undergo lifting while holding a bead part assembly on a separator, the pressing members press against the separator.

6. Apparatus as claimed in claim 5, in which each separator comprises a separator body in the form of a ring having an upper surface formed as a concavo-convex roughened surface and an underside surface formed with an annular recess for receiving a bead part assembly located on a next lower separator in a condition of not contacting the underside surface of the separator body.

7. Apparatus as claimed in claim 6, in which the separator body is formed at a plurality of locations in the vicinity of an outer peripheral edge with engaging portions engageable with the corresponding or complementary engaging portions of an immediately adjacent separator body in a piled condition of separators.

8. Apparatus as claimed in claim 5, in which the first transfer means and the second transfer means are separately mounted on horizontal units capable of reciprocating in horizontal directions and a vertical unit is vertically movably mounted on each of the horizontal units, the bead part assembly holding means being provided on one of the vertical units and the separator holding means being provided on the other vertical unit.

9. Apparatus as claimed in claim 5, in which:
the bead part assembly holding means is turnable between a downwardly facing position and a laterally facing position; and
the separator holding means is fixed in a downwardly facing position.

10. Apparatus as claimed in claim 5, in which the first transfer means includes means for mounting the bead part assembly holding means to be selectively pivotable about a single point or be fixed immovably.

11. Apparatus as claimed in claim 5, in which the bead part assembly stocking part and the emptied separator collecting part are mounted on a wheeled carriage.

* * * * *

UNITED STATES PATENT AND TRADEMARK OFFICE
CERTIFICATE OF CORRECTION

PATENT NO.   : 5,433,815
DATED        : July 18, 1995
INVENTOR(S)  : AIHARA et al It is certified that error appears in the above-indentified patent and that said Letters Patent is hereby corrected as shown below:

On the title page: Item [73] add the following Assignee

-- MITSUBISHI JUKOGYO KABUSHIKI KAISHA Tokyo, Japan --.

Signed and Sealed this

Thirteenth Day of February, 1996

Attest:

BRUCE LEHMAN

*Attesting Officer*      *Commissioner of Patents and Trademarks*